(12) United States Patent
Tani et al.

(10) Patent No.: US 6,389,897 B1
(45) Date of Patent: May 21, 2002

(54) VIBRATORY GYROSCOPES AND METHOD FOR MANUFACTURING THE SAME

(75) Inventors: Makoto Tani, Inazawa; Takayuki Kikuchi, Nagoya, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/504,181

(22) Filed: Feb. 15, 2000

(30) Foreign Application Priority Data

| Feb. 17, 1999 | (JP) | ............................................. 11-038174 |
| Feb. 10, 2000 | (JP) | ........................................ 2000-032546 |

(51) Int. Cl.⁷ ................................................. G01P 9/04
(52) U.S. Cl. .................................................. 73/504.12
(58) Field of Search ........................ 73/504.12, 504.14, 73/504.15, 504.16; 310/326, 327, 370

(56) References Cited

U.S. PATENT DOCUMENTS

| 4,340,835 A | 7/1982 | Nakamura et al. ........... 310/326 |
| 4,628,734 A | * 12/1986 | Watson ..................... 73/504.16 |
| 5,014,554 A | 5/1991 | Terada et al. ............. 73/504.16 |
| 5,239,868 A | 8/1993 | Takenaka et al. ........ 73/504.16 |
| 6,194,817 B1 | * 2/2001 | Yachi et al. ................. 310/370 |

FOREIGN PATENT DOCUMENTS

| DE | 196 40 998 A 1 | 10/1997 |
| EP | 0 844 461 A2 | 5/1998 |

* cited by examiner

Primary Examiner—John E. Chapman
(74) Attorney, Agent, or Firm—Burr & Brown

(57) ABSTRACT

The invention reduces the noise from a vibrating gyroscope used for detecting a turning angular rate, when the vibrator is subjected to external vibration. The vibrator is made out of a piezoelectric material. The vibrator vibrates in a driving vibration mode electrically excited in the vibrator and in a detection vibration mode occurring in the vibrator due to Coriolis force when the vibrator is turned. The surface of the vibrator includes a region where the stress induced in the vibrator due to the detection vibration mode is in a range of a local maximum. The gyroscope further has a damper, for reducing vibration sensitivity to external vibrations applied externally on the vibrator. The damper is made of a polymer and is provided on at least the region where the stress induced in the vibrator due to the detection vibration mode is in a range of a local maximum.

27 Claims, 11 Drawing Sheets

FIG. 1

FIG_2a

FIG_2b

FIG_2c

FIG_3

Stress distribution in detection vibration mode

Ratios to a maximum stress

FIG. 4

Driving vibration mode

Ratios to a maximum amplitude in driving vibration mode

FIG_7a

FIG_7b

FIG_7c

FIG_7d

FIG_8

FIG_9

FIG_12

VIBRATORY GYROSCOPES AND METHOD FOR MANUFACTURING THE SAME

BACKGROUND OF THE INVENTION

1. Technical Field

The present invention relates to a vibratory gyroscope and a method for manufacturing the same.

2. Related Arts

It has been studied to mount a vibratory gyroscope in a car body for controlling its orientation. In such application, the vibratory gyroscope is mounted in a housing, which is then attached on a chassis of the car body. External vibration is inevitably transmitted through the chassis to the gyroscope, possibly causing a malfunction or vibration noise. It is necessary to minimize the noise caused by the external vibration.

Japanese patent application publication "Kokai" 269228/1997 discloses, in a gyroscope using a tuning-fork type vibrator comprising a base and a tuning-fork, a method for reducing the cross-talk noise induced by external vibration. In the column (0002), this publication discloses a method to reduce the vibration noise by adjusting the length of the base within a certain range. J. Yukawa et al. "Angular Rate Sensor for Dynamic Chassis Control" (Sensors and Actuators) 980269, pages 49 to 54, 1998 discloses a method for reducing vibration noise in a vibratory gyroscope comprising a metal vibrator and poly-crystalline piezoelectric elements to drive the vibrator. They reduced vibration noise, due to the beat of the vibrator, by increasing the detuned frequency to a value suitably larger than the cut-off frequency of a low pass filter. The detuned frequency is the difference of resonance frequencies of driving and detection modes of the vibrator. The detuned frequency disclosed is as large as 600 Hz.

SUMMARY OF THE INVENTION

The present inventors have researched to reduce the influence of external vibration on vibratory gyroscopes using a vibrator, and subsequently found that, when external vibration of the same frequency as the detuned frequency is transmitted to the vibrator, relatively large noise is induced in the signal output from the vibrator. Vibration transmitted through a car chassis to a vibratory gyroscope usually includes various frequency components, and the frequency component of the detuned frequency causes the above noise. Therefore, it is necessary to reduce such "vibration noise" induced by an external vibration including the frequency component of the detuned frequency.

The present invention aims to reduce "vibration noise" which is included in the output of a vibrator used in vibratory gyroscopes for detecting the turning angular rate, when the gyroscopes are subjected to external vibrations including the frequency component of the detuned frequency of the vibrator.

One aspect of the present invention provides a vibratory gyroscope for detecting a turning angular rate;

wherein the gyroscope comprises a vibrator made out of a piezoelectric material, the vibrator has a driving vibration mode in which the vibrator is electrically excited and another detection vibration mode for detecting Coriolis vibration occurring in the vibrator when the vibrator is rotated around a detection axis at a turning angular rate, and the vibrator has a surface including a region where stress induced in the vibrator in the detection vibration mode is in a range of a local maximum, the gyroscope further comprising a damper for reducing vibration sensitivity to external vibrations applied externally on the vibrator, the damper being made of a polymer and provided on at least said region.

In this embodiment, the vibrator has a region which does not substantially vibrate in the driving vibration mode and substantially vibrates in the detection vibration mode and a detecting electrode provided on the region. In the driving vibration mode, the amplitude of vibration in the region may preferably be not more than 0.01 of the maximum amplitude of vibration in the vibrator.

Another aspect of the present invention also provides a vibratory gyroscope for detecting a turning angular rate;

the gyroscope comprising a vibrator made of a piezoelectric material, the vibrator comprising one or more driving parts for electrically exciting a driving-mode vibration in the vibrator, one or more detecting parts provided separately from the driving part for detecting a Coriolis vibration occurring in the vibrator when the vibrator is rotated, and a damper for reducing vibration sensitivity to external vibrations applied externally on the vibrator, the damper being made of a polymer and is provided on a surface of the detecting part. Preferably, the damper is not provided on the driving part.

The "driving part" is defined as a part on which a driving means such as a driving electrode is provided. The "detection part" is defined as a part on which a detection means such as a detection electrode is provided. In this aspect, the detection part does not substantially vibrate in the driving vibration mode. Alternatively, in the driving vibration mode, the amplitude in detection part may preferably be not more than 0.01 of the maximum amplitude of vibration in the vibrator.

The present invention also provides a method for manufacturing a vibratory gyroscope for detecting a turning angular rate, the gyroscope comprising a vibrator which has a driving vibration mode for electrically vibrating the vibrator and has a detection vibration mode for detecting Coriolis vibration occurring in the vibrator due to the rotation of the vibrator, the method comprising the steps of;

computing each ratio of each stress at each point of the vibrator to a maximum stress in the whole vibrator by means of a characteristic mode analysis by the finite element method, for the case of the detection vibration mode, determining a region where the ratio is in a range of a local maximum, and providing a damper made of a polymer on the region.

The present inventor succeeded to substantially reduce the above vibration noise included in signal output from a vibrator having a detecting arm, when external vibration including the frequency component of the detuned frequency is transmitted to the vibrator, by providing a damper made of a polymer on the detecting arm.

When the vibrator has a detecting part or parts and a base part, the damper may be provided on either of its main faces and side faces, or on both the main faces, or on either of the main faces and on the side faces, or on both the main faces and on both the side faces. When the detecting part has an elongated shape, and has a root portion extending onto the base part, the damper may preferably be provided in a position which distance from the root is within a half of the length of the detecting part. The damper provided on or near the end portion of the detection part may increase the temperature drift of the gyroscope.

In the above publication "Sensors and Actuators", the authors tried to reduce the vibration noise detected from the gyroscope due to the beat, by increasing the detuned frequency sufficiently larger than the cut off frequency of the low pass filter installed in the gyroscope. However, such method described in the publication does not reduce the induction of the vibration noise in the vibrator due to an external vibration, but reduces such vibration noise component by means of an electric filter. Because the method increases the detuned frequency, the sensitivity of the gyroscope and its signal/noise ratio decrease in an inversely proportional manner to the detuned frequency.

When a damper is provided on the surface of a vibrator, the damper may preferably be provided on a region where stress induced in the vibrator in the detection vibration mode is in a range of a local maximum oh the surface of the vibrator. Such a region includes and is not necessarily identical with the region where stress induced in the vibrator is in a range of the maximum, which does not necessarily mean local maximum. However, assuming a maximum stress in the vibrator in the detection vibration mode as 1.0, the damper may preferably be provided on a region where its minimum stress is not less than 0.01 and its maximum stress is not less than 0.7, more preferably not less than 0.8.

The damper may preferably be provided, on the surface of the vibrator, on a region where the stress in the detection vibration mode is large, thus maximizing the effect of reducing the vibration noise due to external vibration including the frequency component of the detuned frequency. Moreover, the damper may preferably cover the whole of the region where the stress in the detection vibration mode is large, thus reducing the fluctuation inevitably caused during the actual manufacturing process of the damper.

The damper may preferably be provided, on the surface of the vibrator, on a region where the ratio of the stress induced in the vibrator to its maximum value in the driving vibration mode is not more than 0.1, not to increase the driving impedance of the vibrator. A larger driving impedance needs a higher driving voltage for the driving circuit, and consumes more power in the vibratory gyroscope.

Preferably, the damper may not be provided on a region in which each amplitude of vibration of each point is not less than 0.1 of the maximum amplitude of vibration in the vibrator in the driving vibration mode. The damper provided on a region, in which amplitude of vibration is large in the driving vibration mode, increases the driving impedance of the vibrator, the voltage necessary for driving the vibrator and thus the overall consumed electrical power of the gyroscope. Moreover, such damper also increases the temperature drift of the gyroscope because the viscoelasticity of the damper is changed over its temperature, thus affecting the output signal. Such adverse effects of the temperature drift may be more substantial when the vibrator is made of a piezoelectric single crystal such as quartz.

When the vibrator is plate-shaped with two main faces and side faces, and when its detection mode vibration is parallel with the main faces, the region with maximum stress induced in the vibrator in the detection vibration mode is often located on the side face of the faces of the detecting part. In this case, the damper may preferably be provided on such side face of the faces of the detecting part. However, when the damper is not provided on the region with maximum stress on the side face or faces and provided on either or both of regions, adjacent to the region with maximum stress on the side face, of the two main faces, the above inventive effects may also be obtained. The damper may preferably be provided on the detecting electrode on the detecting part. Most preferably, the damper is provided only on the detecting part and is not provided on any other portions of the vibrator.

The inventive vibrator may be formed out of a permanent elastic alloy such as elinver. In this case, a polycrystalline piezoelectric element is formed on the vibrator. The inventive vibrator may preferably be made of a piezoelectric single crystal. In this case, a pair of driving electrodes, for exciting vibration in the driving vibration mode, and a pair of detecting electrodes, for detecting Coriolis vibration occurring in the vibrator due to the rotation of the vibrator, are provided on the vibrator. Since a piezoelectric single crystal usually has an extremely low viscosity, the inventive polymeric damper may be particularly effective. Such a single crystal includes quartz and single crystals of $LiTaO_3$, $LiNbO_3$ and $LiTaNbO_3$.

The damper may be formed of a viscoelastic material with a small temperature variation in its dynamic viscoelasticity between −40° C. to +85° C., in which the vibratory gyroscope Is usually used. The ratio of the maximum to the minimum of the dynamic viscoelasticity may preferably be not more than 3.0 between −40° C. to +85° C. Such viscoelastic material includes a silicone rubber, a synthetic rubber such as ethylene-propylene rubber, butyl rubber and urethane rubber, a fluoride resin such as "Teflon" and ethylene-tetrafluoride resin, vinyl chloride resin, "nylon" and polyethylene resin. The viscoelastic material may preferably has a dynamic modulus of $10^2$ to $10^{10}$ Pa and a dynamic loss of $10^1$ to $10^8$ Pa. The thickness of the damper may be generally adjusted so as to be inversely proportional to the dynamic viscoelasticity.

The damper may be formed by means of any method. For example, the damper may be a cured coating film formed on the vibrator by means of coating, potting, or spray coating. For example, various silicone adhesive agents of, for example, alcohol-liberating, acetone-liberating, oxime-liberating, acetic acid-liberating, or addition reaction types may be potted and adhered on the vibrator by means of a dispenser. When liquid type material is coated or potted on the vibrator, such liquid type material may preferably have a viscosity of not more than 100 Pa·s to readily cover a larger area and to produce a coated film with a uniform thickness. A sheet or plate shaped material may be adhered on the vibrator to provide the inventive damper.

The inventive vibratory gyroscope may have external members contacting the vibrator. Such members may preferably be located in positions symmetrical with respect to the center of gravity GO of the vibrator. For example, leads, for electrically connecting electrodes on the vibrator and an external electrical circuit, may preferably be located in positions symmetrical with respect to the center of gravity GO.

The vibrator may be fixed to a base, such as a can package, by means of a supporting member. In this case, a buffer member, made of a material (such as a polymer) with an elasticity lower than that of the material constituting the vibrator, may be inserted between the vibrator and the supporting member. The vibrator may vibrate in torsion and deflection vibration modes with the supporting member as its fulcrum, as a result of the deformation of the buffer member. The elasticity, dimensions and shape of the buffer member may be adjusted so that the two vibration modes have their eigenfrequencies of 200 Hz to 2 kHz.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

For a better understanding of the invention, reference is made to the attached drawings, wherein.

The present invention may preferably be applied to vibratory gyroscopes which have a horizontal vibrator as follows. The vibrator has at least a plurality of vibration systems, each system extending in a specified plane normal to the axis for rotation detection. The vibration systems include a first vibration system, whose vibration comprises a radial vibration component vibrating in a diametrical direction with respect to the center of gravity of the vibrator in a specified plane, and a second vibration system, whose vibration comprises a circumferential vibration component vibrating circumferentially with respect to the center of gravity in a specified plane. One of the first vibration system and the second vibration system comprises a driving part and the other comprises a detecting part.

The circumferential vibration component means a vibration component vibrating circumferentially with respect to the center of gravity GO of the vibrator in the specified plane. The radial vibration component means a vibration component vibrating radially with respect to the center of gravity GO in the specified plane.

The first and the second vibration systems are connected with each other by means of a certain connecting part to form a vibrator extending in the specified plane. Such vibrator is to be rotated around an axis "Z" as an arrow ω to detect the turning angular rate.

These and other objects, features and advantages of the present invention will be appreciated upon reading the following description of the invention when taken in conjunction with the attached drawings, with the understanding that some modifications, variations and changes of the same could be made by the skilled person in the art.

In the preferred embodiment, the driving vibration system has an elongate supporting portion extending from the periphery of the base portion and at least one driving part extending from the supporting portion and in a direction crossing the supporting portion. The driving part vibrates in bending motion around the root of the part to the supporting portion as its fulcrum. When the vibrator is turned in a specified plane, the supporting portion vibrates in bending motion in the specified plane around the root of the supporting portion to the base portion as the fulcrum of the bending vibration.

More preferably, the detection vibration system has an elongate detection vibration part extending from the periphery. When the vibrator is turned in the specified plane, the detection vibration part vibrates in bending motion around the root of the part to the base portion as the fulcrum of the bending vibration.

Most preferably in this embodiment, when the vibrator is turned in the specified plane, the supporting portion and detection vibration part vibrate in bending motion in the specified plane around their roots to the base portion and in reverse phases circumferentially with respect to the center G0 of gravity.

Preferably, a plurality of driving vibration systems are provided in positions centrosymmetrical with respect to the center GO of gravity. For example, in FIG. 1, the driving vibration systems 2A and 2B are provided in positions 180° distant from each other. In other words, when the system 2A is turned 180° around the center GO, it is positioned on the system 2B. The systems may preferably be provided on positions being diad-, triad-, or quad-symmetrical with each other.

The displacement of the inventive vibrator may preferably be induced in a specified plane. In this case, the above noise may be particularly problematic.

In a more preferable embodiment, the base portion has a shape being centrosymmetrical with respect to the center of gravity of the vibrator in a specified plane. Such base portion with a highly symmetrical shape may reduce the irregular vibration caused in the vibrator when the external noise is applied on the vibrator. The meaning of "centrosymmetrical" is the same as described above. The shape of the base portion may preferably be triad-, quad-, pentad-, or hexad-symmetrical and most preferably be quad-symmetrical.

Figure 1:
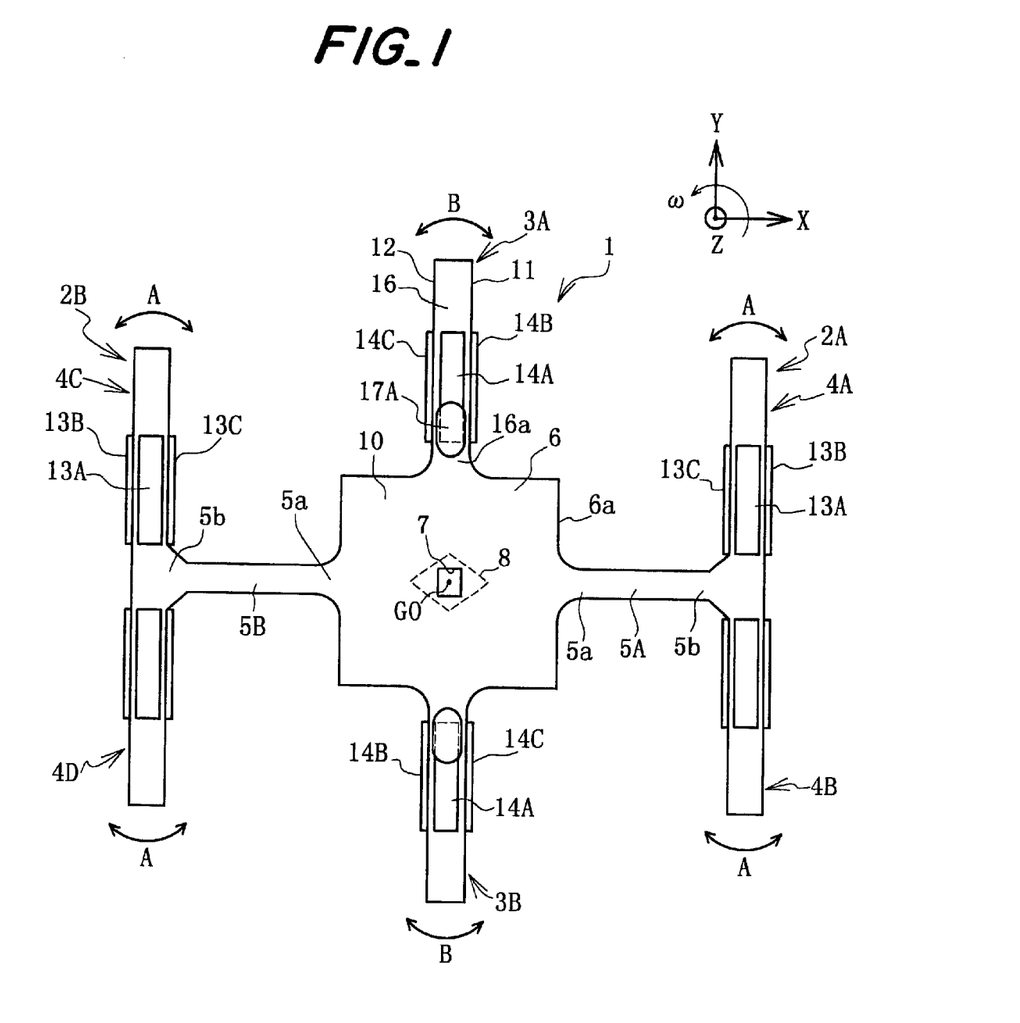
FIG. 1 is a plane view schematically showing a vibrator for a vibratory gyroscope of the present invention.

FIG. 1 is a plain view roughly showing a vibrator 1 made of a piezoelectric single crystal according to this embodiment. A base part 6 is in a shape of square having its center at the center of gravity GO of the vibrator. Two driving vibration systems 2A, 2B (the first vibration system in this example) and two detecting vibration systems 3 A, 3 B (the second vibration system) project radially in four directions from the periphery 6a of the base part 6. The respective vibration systems are separated from one another. The driving vibration systems 2A and 2B are diad-symmetric with respect to the center of gravity GO, and the detecting vibration systems 3A and 3B are diad-symmetric with respect to the center of gravity GO. The vibrator extends in the X-Y plane and is to be rotated around the axis of "Z".

The driving vibration systems 2A and 2B are provided with connecting parts 5A and 5B, projecting from the periphery 6a of the base part 6, and driving parts 4A, 4B, 4C and 4D extending from the nodal ends 5b of the connecting parts 5A and 5B perpendicularly to the connecting parts. The driving parts 4A, 4B, 4C and 4D are provided with driving electrodes 13A, 13B, 13C and 13D, and bending-vibrate due to the piezoelectric force applied electrically through the electrodes. The detecting vibration systems 3A and 3B comprise long and narrow detecting parts 16 which are provided with detecting electrodes 14A, 14B, 14C and 14D, and bending-vibrate circumferentially due to the Coriolis vibration.

Figure 2A:
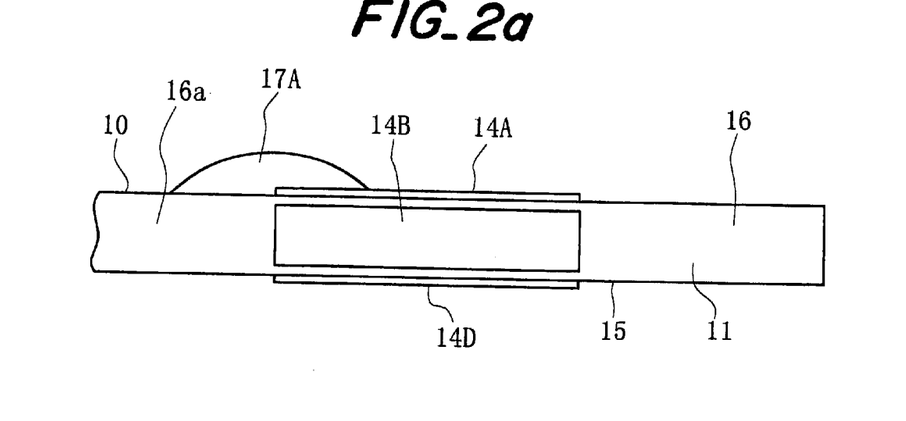
FIGS. 2(a), 2(b) and 2(c) are side views showing a detecting part 16 of the vibrator, detecting electrodes 14A, 14B and 14D and a damper 17A.
Figure 2B:
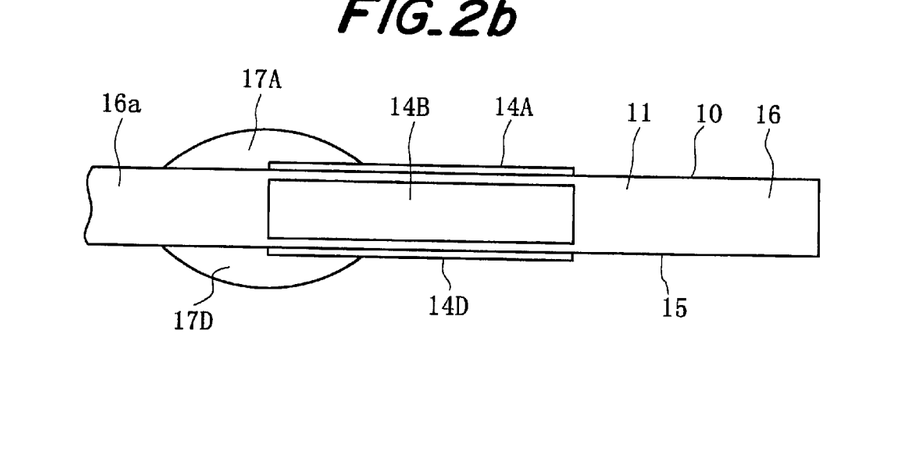
Figure 2C:
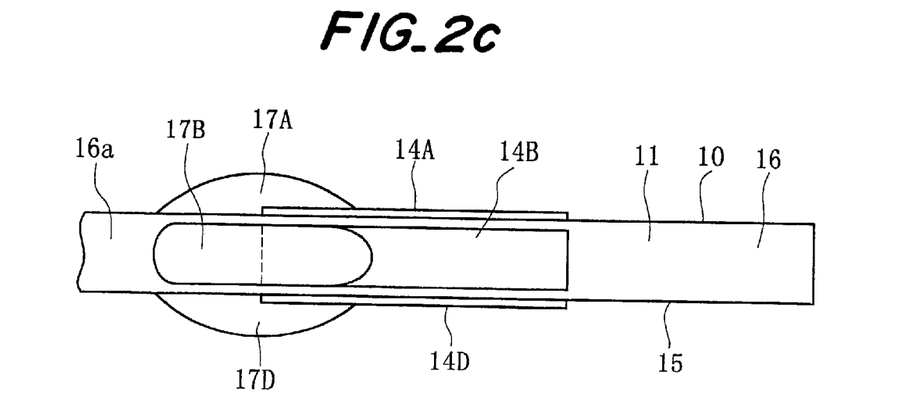

As shown in FIGS. 1 and 2(a), on a region 16a near the root of each detecting part 16 a damper 17A is provided on one main face 10 of the vibrator. As shown in FIG. 2(b), on the region 16a, dampers 17A and 17D may be provided on one main face 10 and the other main face 15. Moreover, as shown in FIG. 2(c), on the region 16a, dampers 17A, 17D and 17B may be provided on one main face 10, the other main face 15 and a pair of side faces 11 and 12, respectively.

The stress induced in the vibrator in the detection vibration mode is usually in a range of its maximum in such region near the root of the detecting part of the vibrator. The vibration amplitude and stress at each point on the vibrator of this example will be described below.

The present inventors applied a characteristic mode analysis by means of the finite element method to a vibrator of FIG. 1 in order to examine the distribution of vibration in the driving vibration mode and the detecting vibration mode. The inventors assumed quartz for the vibrator material, and obtained each ratio of amplitude of vibration at each point of the vibrator to its maximum amplitude of vibration, in the whole vibrator, in each of the driving and detection vibration modes.

Figure 4:
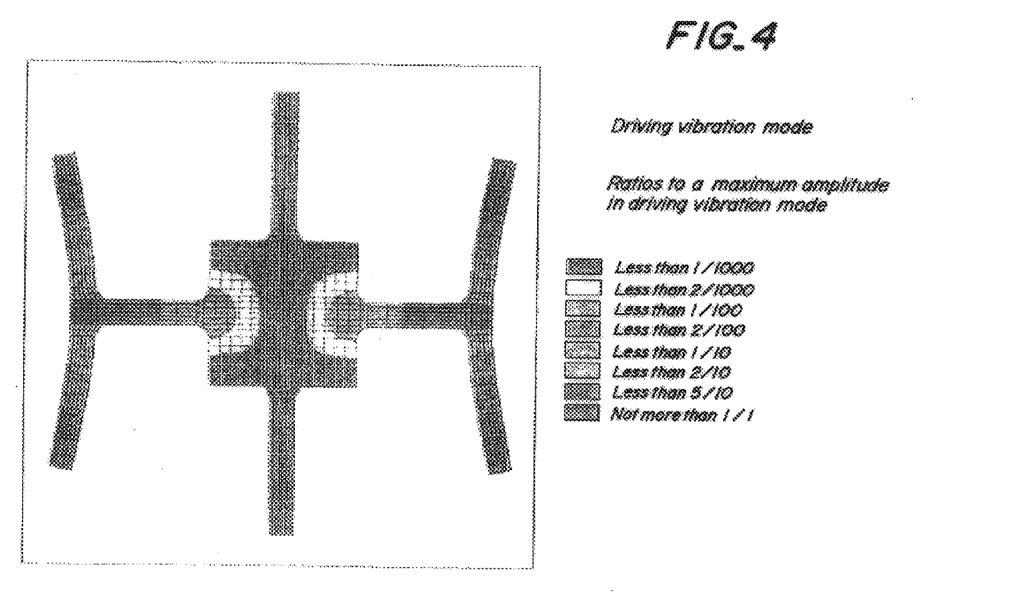
FIG. 4 is a colored map showing the ratio of the vibration amplitude at each point, in the vibrator of FIG. 1, to its maximum amplitude in the whole vibrator in its driving vibration mode.
Figure 5:
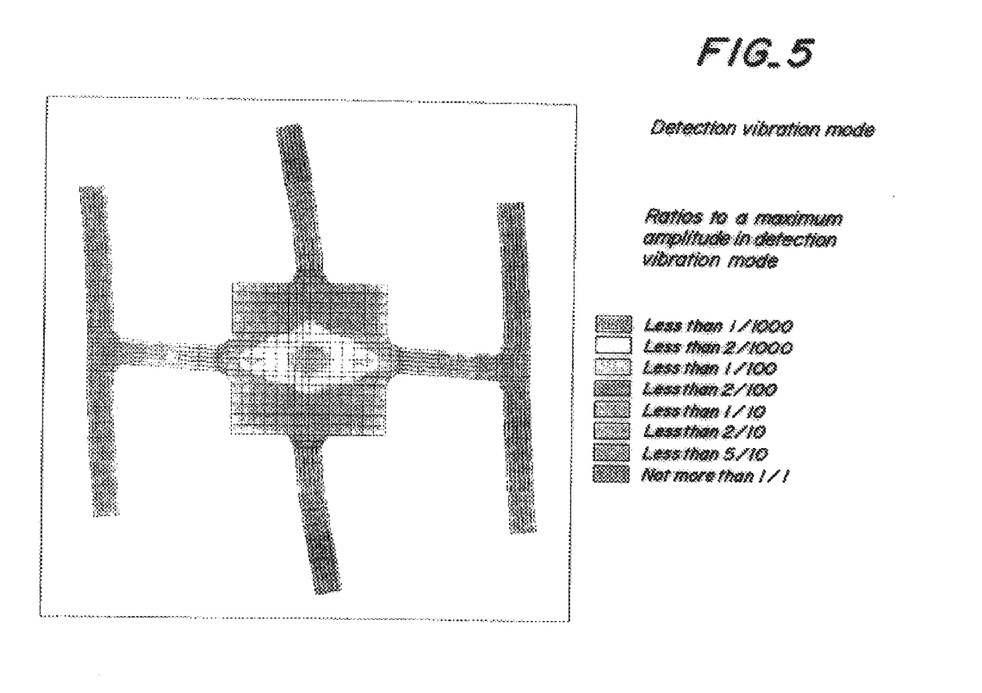
FIG. 5 is a colored map showing the ratio of the vibration amplitude at each point, in the vibrator of FIG. 1, to its maximum amplitude in the whole vibrator in its detection vibration mode.

FIG. 4 shows the above ratio at each point of the vibrator when the amplitude of the vibration is its maximum in the driving vibration mode, and FIG. 5 shows the above ratio at each point of the vibrator when the amplitude of the vibration is its maximum in the detection vibration mode. In the driving vibration mode shown in FIG. 4, the driving parts 4A, 4B, 4C and 4D bending-vibrate around the respective nodal ends 5b of the connecting parts 5A and 5B. In the detection mode shown in FIG. 5, the connecting parts 5A and 5B bending-vibrate circumferentially around the respective roots 5a, and detecting parts 16 of the two detecting vibration systems bending-vibrate circumferentially as shown in an arrow B opposite to the vibration of the connecting parts 5A and 5B.

In FIGS. 4 and 5, the domains represented with different colors have the respective ratios of the vibration amplitudes in the range corresponding to each color. The domain colored with orange represents the domain having a vibration amplitude in the smallest range.

According to FIG. 4, the vibration of the driving vibration systems 2A and 2B induces deformation and tensile stress in the vicinities of the roots 5a of the connecting parts 5A and 5B in the driving vibration mode. However, since the driving vibration systems 2A and 2B are arranged in diad-symmetric positions, influences of the system vibration cancel out each other in the vicinity of the center 8 of the base part and in the detecting vibration systems 3A and 3B, which are located between the driving vibration systems.

According to FIG. 5, the influences of the vibration of the driving vibration systems 2A and 2B cancel out each other in the vicinity of the center 8 of the base part in the detection vibration mode, since the systems are arranged in diad-symmetric positions. The influences of the vibration of detecting vibration systems 3A and 3B also cancel out each other in the vicinity of the center 8 of the base part, since the systems are arranged in diad-symmetric positions. As a result, no influence by the detecting vibration is seen in the vicinity of the center 8 of the base part (see FIGS. 1 and 5).

When a detecting electrode or electrodes is provided on the surface, preferably on the main faces and/or side faces, the damper may preferably cover at least a portion of the detecting electrode. When the detecting part has its root on the base part and the detecting electrode has an edge portion near the root, at least the edge portion may preferably be covered with the damper. The inventive damper covering the edge portion of the electrode is quite effective for reducing the above vibration noise due to external vibrations including a frequency component of the detuned frequency. The vicinity of the edge portion of the electrode usually has the largest deformation or stress go that the electrode efficiently converts the vibration of the vibrator to a corresponding signal.

In this case, the damper may preferably be provided on both of the edge portion of the detecting electrode and at least a portion of the surface of the detecting part.

Preferably, the vibrator is supported on a region 8 which has smallest vibration amplitude in the detection vibration mode, or has a supporting hole formed in the region 8 for inserting an external supporting member therein.

In this embodiment, as shown in FIGS. 1, 4 and 5, the center of gravity GO is located within a region with the smallest vibration amplitude in the driving vibration mode and also within a region with the smallest vibration amplitude in the detection vibration mode.

Figure 3:
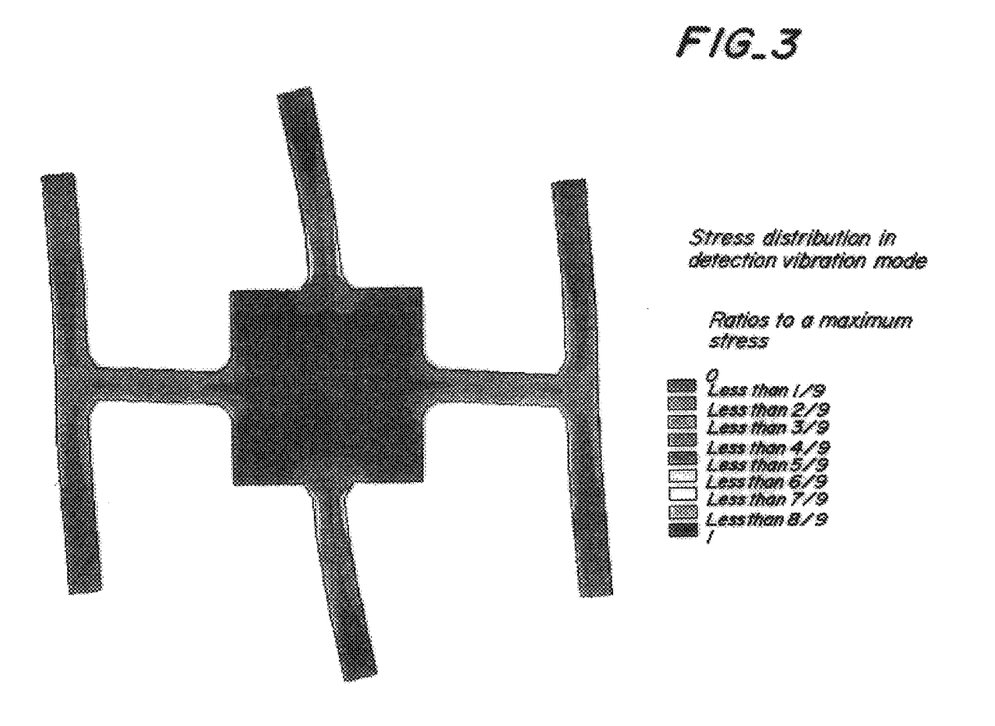
FIG. 3 is a colored map showing the distribution of stress in the vibrator of FIG. 1 in its detection vibration mode.
Figure 6A:
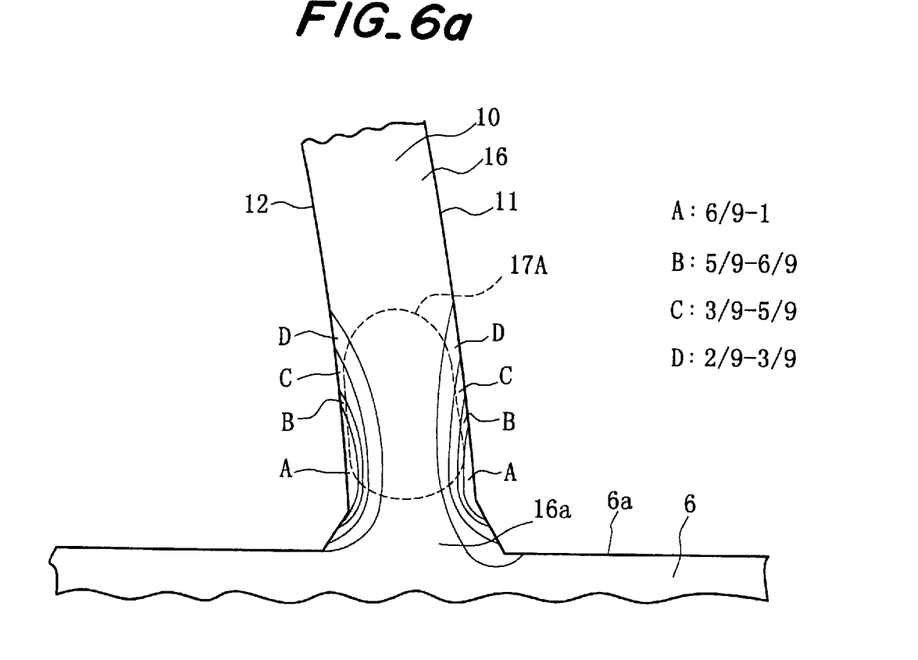
FIG. 6(a) is a plain view illustrating the distribution of stress in one main face 10 in the detecting part 16 of the vibrator and the location of the damper 17A.

FIG. 3 shows the distribution of stress obtained by means of the above characteristic mode analysis utilizing the finite element method. In FIG. 3, each point is classified by nine colors according to the ratio of the stress at the point to the maximum stress in the whole vibrator. The respective colors correspond to ratio ranges of 1.0 to 8/9, 8/9 to 7/9, 7/9 to 6/9, 6/9 to 5/9, 5/9 to 4/9, 4/9 to 3/9, 3/9 to 2/9, 2/9 to 1/9 and 1/9 to 0/9. As shown in FIG. 6(a), the main faces 10 are layered by the regions with different ratio ranges (A), (B), (C) and (D), which ratios are in the ranges 1.0 to 6/9, 6/9 to 5/9, 5/9 to 3/9, and 3/9 to 2/9, respectively.

Figure 6B:
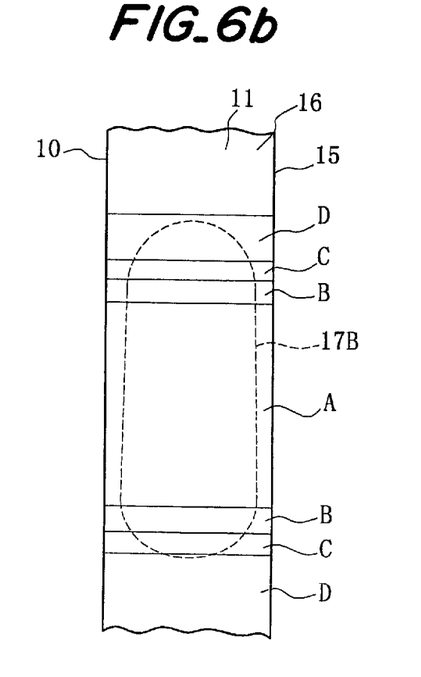
FIG. 6(b) is a plain view illustrating the distribution of stress in one side face 11 in the detecting part 16 and the location of the damper 17B.

In this embodiment, as shown in FIG. 6(b), the areas of the respective regions (A), (B) and (C), which have especially large ratios, are larger in the side faces 11 or 12 of the vibrator than in the main face 10.

In the above embodiment, the damper may be provided on one main face 10 and/or on the other main face 15 of the detecting part as shown in FIG. 6(a), and may be provided on the side face 11 and/or 12 of the detecting part as shown in FIG. 6(b).

Methods for supporting the vibrator will be described further in detail.

Figure 7A:
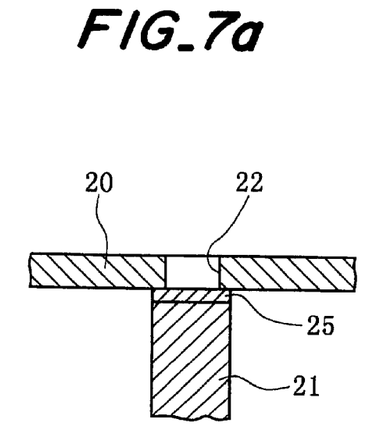
FIGS. 7(a), 7(b), 7(c) and 7(d) are cross sectional views schematically showing the examples of structures supporting the inventive vibrator.
Figure 7B:
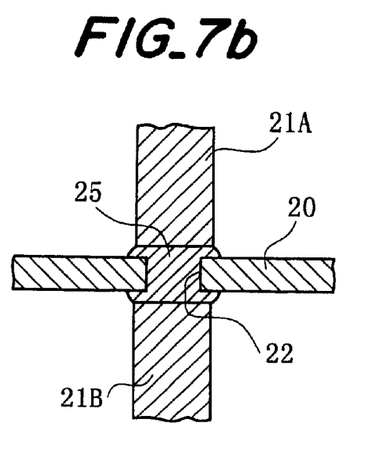
Figure 7C:
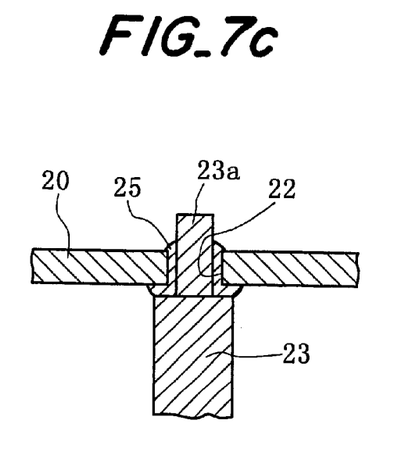
Figure 7D:
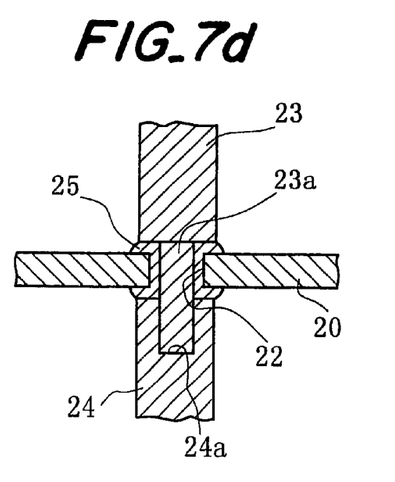

In FIG. 7(a), a supporting hole 22 is formed in a vibrator 20, and a projection 21 of a supporting member is arranged below the hole 22. A buffer member or layer 25 is inserted between one of the main faces of the vibrator 20 and the projection 21 to join them. In FIG. 7(b), projections 21A and 21B are arranged above and below the vibrator 20 and the hole 22, and the hole 22 and the gaps between the vibrator 20 and the projections 21A and 21B are filled with a joining material such as a silicone polymer to form a buffer member or layer 25. As shown in FIG. 7(c), a projection 23a of a supporting member 23 is inserted into and through the hole 22, and the gaps between an end face of the supporting member 23 and the vibrator 20 and between the projection 23a and the inner wall of the hole 22 are filled with a joining material to form a buffer member or layer 25. In FIG. 7(d), supporting members 23 and 24 are arranged above and below the vibrator 20 and the hole 22. A pin or projection 23a is provided on the member 23, and a hole 24a is formed in the member 24. The pin 23a is inserted into and through the hole 22 and further inserted into the hole 24a. Then, the gaps between the vibrator 20 and each end face of the supporting member 23 and 24 and between the pin 23a and the inner wall of the hole 22 are filled with a joining material to form a buffer layer 25.

EXAMPLE 1
and

Comparative Example 1

A vibratory gyroscope shown in FIG. 1 was produced. A chromium film of 200 angstroms in thickness and a gold film of 5000 angstroms in thickness were formed on a wafer made of a Z-plate of quartz with a thickness of 0.3 mm, by means of the sputtering method. Both main faces of the wafer were coated with a resist film.

The resulting wafer was immersed in an aqueous solution of iodine and potassium iodide to remove excessive gold in the gold film by etching, and was further immersed in an aqueous solution of cerium-ammonium nitrate and perchloric acid to remove excessive chromium in the chromium film by etching. The wafer was etched by immersing the wafer in ammonium bifluoride at a temperature of 80° C. for 20 hours to form the external shape of the vibrator as shown in FIG. 1. An aluminum film of 2000 angstroms in thickness was formed as an electrode film, using a metal mask.

The base part 6 of the thus obtained vibrator has dimensions of 6.0 mm×6.0 mm. Each detecting part 16 has a width of 1.0 mm and a length of 6.0 mm. Each detecting electrode 14A, 14B, 14C or 14D has a width of 0.6 mm and a length of 2.8. The electrode is provided from a position 1.2 mm distant to a position 4.0 mm distant from the root of the detecting part 16.

In the example 1, as shown in FIG. 1, a damper 17A was provided on one main face 10 and on a region near the root of each detecting part 16 by potting a silicone adhesive agent using a dispenser and curing it at room temperature. The adhesive used was a one-part adhesive, alcohol-liberating and room temperature vulcanizing silicone polymer with a dynamic elasticity of $5 \times 10^6$ Pa and a dynamic loss of $5 \times 10^5$ Pa. The damper 17A formed covers a region from 0.5 mm to 1.9 mm apart from the root of the detecting part 16. As shown in FIG. 7(c), a square-shaped supporting hole 22 with dimensions of 0.75 mm×0.75 mm was formed in the center of the vibrator. A metal pin 23a with a diameter of 0.6 mm was inserted in and through the supporting hole 22. The vibrator was then adhered to the metal pin with a silicone adhesive.

Alternatively, a vibrator of comparative example 1 was obtained similar to example 1, except that a damper was not provided.

Electrical impedance characteristics of each vibrator were measured using an impedance analyzer. The frequency variations of the electrical impedances between the driving electrodes and between the detecting electrodes were measured to estimate the frequencies and sharpnesses of resonance of the driving and detection vibration modes respectively. The detuned frequency was calculated as the difference of the two resonance frequencies. Then, the vibrators were installed into vibratory gyroscopes, and the gyroscopic characteristics and the vibration noise characteristics of each gyroscope were also measured. Here, the electrical signal obtained from the detecting electrodes was synchronously detected with a lock-in amplifier synchronizing with the driving current of the vibrator, to output a demodulated signal. As to the gyroscopic characteristics, the gyroscope was mounted on a rotation table, and the voltage of the demodulated signal was measured, during rotation of the vibrator and when the vibrator was not rotated. The gyroscope sensitivity was obtained as the output voltage of the demodulated signal per unit turning angular rate when rotated. The zero point voltage was obtained as the output voltage when not rotated. The S/N ratio was calculated as the ratio of the gyroscope sensitivity to the zero point voltage. As to the vibration noise characteristics, each gyroscope was mounted on a vibration machine and the output voltage of the demodulated signal was measured, during vibration in various frequencies from 100 to 300 Hz. The vibration sensitivity was calculated as the output voltage per unit vibration acceleration for each vibration frequency, then the peak sensitivity in the frequency variation was obtained. These results were shown in table 1.

TABLE 1

| | | Example 1 | Comparable Example 1 |
|---|---|---|---|
| Electrical impedance characteristics | Resonance frequency of driving vibration | 21,868 Hz | 21,762 Hz |
| | Resonance frequency of detection vibration | 21,628 Hz | 21,588 Hz |
| | Detuned frequency | −240 Hz | −174 Hz |
| | Resonance sharpness of driving vibration | 18,897 | 19,419 |
| | Resonance sharpness of detection vibration | 2,162 | 20,016 |
| Gyroscopic sensor characteristics | Zero point voltage (mVrms) | 0.42 | 0.90 |
| | Gyroscopic sensitivity (mVrms/rad/s) | 0.083 | 0.078 |
| | S/N ratio (rad/s)$^{-1}$ | 0.20 | 0.09 |
| Vibration sensitivity | Peak frequency | no peak | 175 Hz |
| | Peak value (deg/s/G) | Not more than 0.2 | 1.2 |

Figure 8:
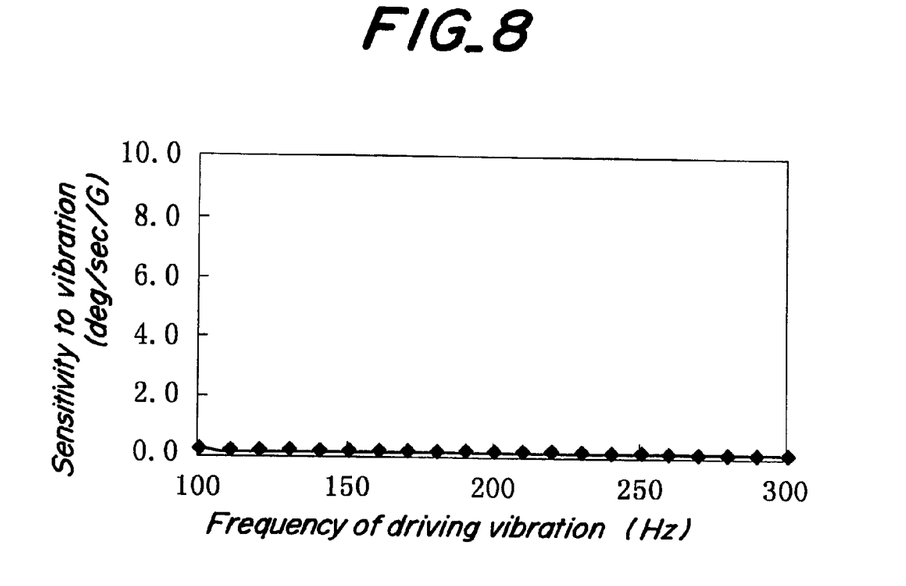
FIG. 8 is a graph showing the relationship between the frequency of external vibration and the vibration sensitivity of the vibratory gyroscope, in the example 1
Figure 9:
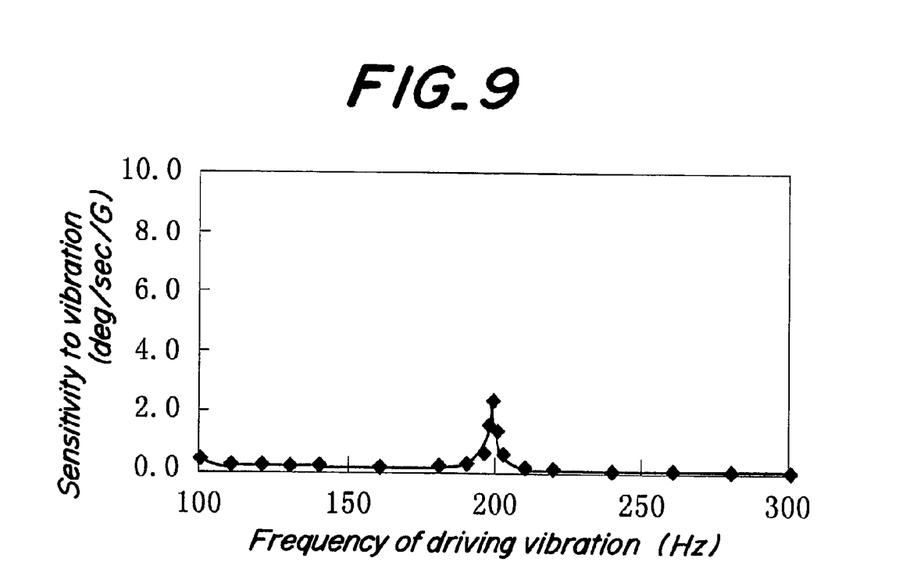
FIG. 9 is a graph showing the relationship between the frequency of external vibration and the vibration sensitivity of the vibratory gyroscope, in the comparative example 1.

FIG. 8 shows the relationship between the vibration sensitivity and the frequency of the external vibration in example 1, and FIG. 9 shows the same relationship in the comparative example 1. In example 1, the peak value of the vibration sensitivity was considerably reduced to about ⅙ of that in comparative example 1, without reducing its S/N ratio compared with that in comparative example 1.

When the damper was provided on either or both of two main faces of the detecting part in the present invention, the damper may preferably be provided so as to cover a maximum stress point on the center line of each of the main face, in which point the maximum stress in the detecting part is induced in the detection vibration mode.

Figure 10:
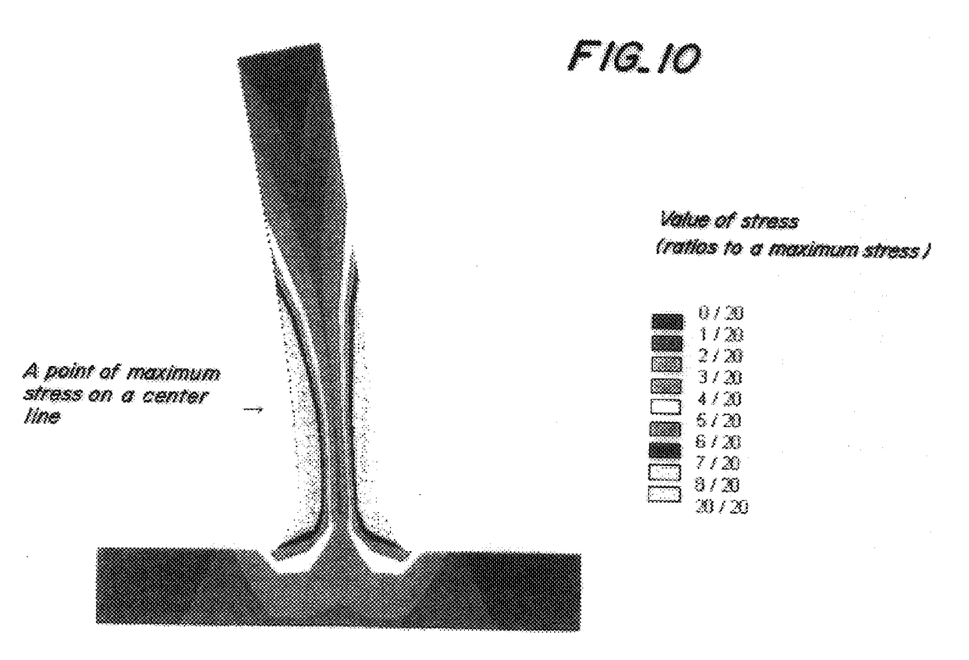
FIG. 10 is a colored map showing the distribution of stress in the detecting part 16 in the detection vibration mode of the vibrator of FIG. 1.

Such an embodiment of the invention will be described referring to the vibrator of example 1. In FIG. 3, the ratios of the stress on all points on the center line of the detecting part to the maximum stress in the whole vibrator is in the same range of 0 to ⅕ in the detection vibration mode, therefore the above maximum stress point on the center line is unclear from the figure. FIG. 10 shows the ratio of stress on each point in the detecting part in terms of 1/20 units from 0/20 to 8/20, to make clear the maximum stress point.

Figure 11:
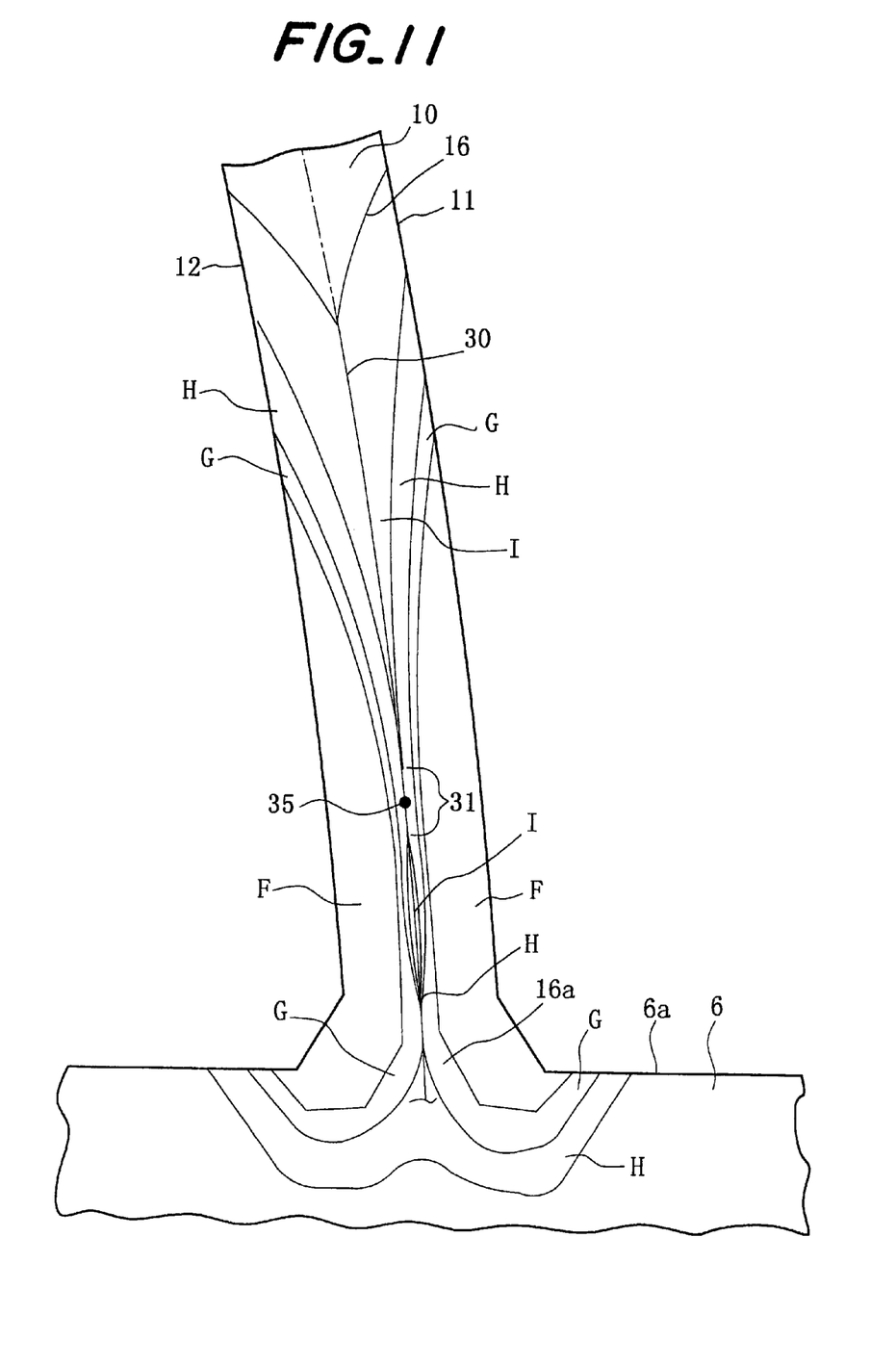
FIG. 11 is a line diagram illustrating the distribution of stress shown in FIG. 10.

FIG. 11 is a line diagram schematically illustrating the stress map of FIG. 10. The center line of the main face 10 of the detecting part 16 is deformed to a some extent and vibrates as shown in 30 of FIG. 3 in the detection vibration mode. In FIGS. 10 and 11, (F),(G),(H) and (I) are the regions where the ratios are 4/20 to 20/20, 3/20 to 4/20, 2/20 to 3/30 and 1/20 to 2/20, respectively. As shown by FIG. 11, the center line 30 on the main face 16 mainly belongs to the region (I) and also belongs to the region (H), which has a larger ratio in a particular region 31 near the root of the detecting part. The damper may preferably cover at least a portion of the region 31, and most preferably cover the whole of the region 31.

Figure 12:
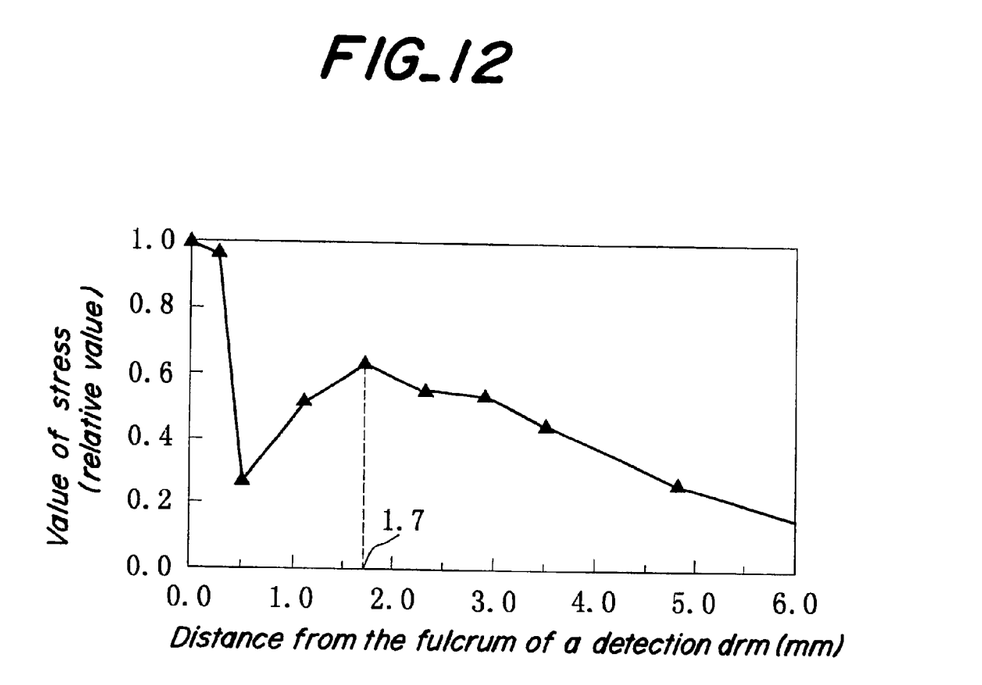
FIG. 12 is a graph showing the relationship between the distance of each point along the center line of the main face 10 from the root of the detecting part 16, and the ratio of stress at the each point to the maximum stress in the whole vibrator.

In the vibrator of example 1, as shown in FIG. 11 and a graph of FIG. 12, a point 35 where the ratio is a local maximum is located about 1.7 mm distant from the root of the detecting part, The damper may preferably cover at least the point 35.

When the damper is provided on either or both of two main faces of the detecting part in the invention, the damper preferably covers at least the point on the center line where its curvature is a local maximum in the detection vibration mode. As shown in FIGS. 10 and 11, such a point where its curvature is a local maximum may be easily calculated out using the finite element method.

EXAMPLE 2 and

Comparative Example 2

Vibratory gyroscopes of example 2 and comparative example 2 were made the same as those in example 1 and comparative example 1, except that each vibrator has no supporting hole and was supported by means of a metal pin with a circular cylindrical shape of a diameter of 4 mm, by adhering the central portion of the vibrator and the end face of the pin through a layer made of a silicone adhesive with a diameter of 3.5 mm and a thickness of 0.4 mm. The results of the measurement about each vibratory gyroscope were shown in table 2.

TABLE 2

|  |  | Example 2 | Comparable Example 2 |
|---|---|---|---|
| Electrical impedance characteristics | Resonance frequency of driving vibration | 21,600 Hz | 21,599 Hz |
|  | Resonance frequency of detection vibration | 21,444 Hz | 21,460 Hz |
|  | Detuned frequency | −156 Hz | −139 Hz |
|  | Resonance sharpness of driving vibration | 17,763 | 18,324 |
|  | Resonance sharpness of detection vibration | 678 | 13,206 |
| Gyroscopic sensor | Zero point voltage (mVrms) | 0.12 | 0.19 |
|  | Gyroscopic sensitivity (mVrms/rad/s) | 0.17 | 0.20 |
|  | S/N ratio (rad/s) | 1.42 | 1.05 |

TABLE 2-continued

|  |  | Example 2 | Comparable Example 2 |
|---|---|---|---|
| Vibration sensitivity | Peak frequency | no peak | 138 Hz |
|  | Peak value (deg/s/G) | Not more than 0.2 | 0.6 |

As shown in the above description, the present invention reduces such noise in the signal output from a vibrator used in vibratory gyroscopes for detecting a turning angular rate, that is induced by external vibrations including the frequency component of the detuned frequency of the vibrator.

The present invention has been explained referring to preferred embodiments, however, the present invention is not limited to the illustrated embodiments which are given by way of examples only, and may be carried out in various modes without departing from the scope of the invention.

What is claimed is:

1. A vibratory gyroscope for detecting a turning angular rate, wherein the gyroscope comprises a piezoelectric vibrator that vibrates in a driving vibration mode which is electrically excited in the vibrator and in a detection vibration mode which occurs in the vibrator due to Coriolis force when the vibrator is turned, and the surface of the vibrator includes a first region where stress induced in the vibrator due to the detection vibration mode is in a range of a local maximum, the gyroscope further comprising a damper for reducing vibration sensitivity to external vibrations applied externally on the vibrator, the damper being made of a polymer and being provided on said first region and only other regions of the vibrator where the amplitude of vibration is less than 0.1 of the maximum amplitude of vibration in the vibrator in the driving vibration mode.

2. A vibratory gyroscope as claimed in claim 1, wherein the vibrator comprises one or more driving parts for electrically exciting vibration in the driving vibration mode and one or more detecting parts for detecting vibration in the detection vibration mode, with the damper provided on the detecting part.

3. A vibratory gyroscope as claimed in claim 2, wherein the vibrator is composed of a piezoelectric single crystal, and the gyroscope comprises a driving electrode, for electrically exciting a vibration in the driving vibration mode, on the surface of each driving part and a detecting electrode, for detecting the vibration in the detection vibration mode, on the surface of each detecting part.

4. A vibratory gyroscope as claimed in claim 3, wherein the detecting part comprises its root, the detecting electrode comprises an edge portion near the root, and the damper covers at least the edge portion.

5. A vibratory gyroscope as claimed in claim 2, wherein the vibrator extends in a specified plane and the entire surface includes a pair of main faces extending substantially in parallel with the specified plane and one or more side faces are substantially perpendicular to the specified plane, the damper provided on at least one face selected from the main faces and side faces.

6. A vibratory gyroscope as claimed in claim 2, wherein the whole surface includes a second region where the stress induced in the vibrator due to the driving vibration mode is not higher than $1/10$ of a maximum value of the stress due to the driving vibration mode, with the damper provided on the second region.

7. A vibratory gyroscope as claimed in claim 1, wherein the vibrator extends in a specified plane and the entire surface includes a pair of main faces extending substantially in parallel with the specified plane and one or more side faces are substantially perpendicular to the specified plane, the damper provided on at least one face selected from the main faces and side faces.

8. A vibratory gyroscope as claimed in claim 7, wherein the damper is provided on at least one main face of the detecting part and covers a maximum curvature point on the main face, the point located on the center line of the main face where the curvature of the center line is maximum when the vibrator is deformed in the detection vibration mode.

9. A vibratory gyroscope as claimed in claim 7, wherein the damper is provided on at least one main face of the detecting part and covers a maximum stress point on the main face, the point located on the center line of the main face where the stress is maximum in the center line when the vibrator is deformed in the detection vibration mode.

10. A vibratory gyroscope as claimed in claim 7, wherein the vibrator is turned around a turning axis crossing through the specified plane, the vibrator comprises a plurality of vibration systems each extending in the specified plane, the vibration systems include a first vibration system, whose vibration comprises a radial vibration component vibrating in a diametrical direction with respect to the center of gravity of the vibrator in the specified plane, and a second vibration system, whose vibration comprises a circumferential vibration component vibrating circumferentially with respect to the center of gravity in the specified plane, one of the first vibration system and second vibration system comprises the driving part and the other comprises the detecting part.

11. A vibratory gyroscope as claimed in claim 7, wherein the whole surface includes a second region where the stress induced in the vibrator due to the driving vibration mode is not higher than $\frac{1}{10}$ of a maximum value of the stress due to the driving vibration mode, with the damper provided on the second region.

12. A vibratory gyroscope as claimed in claim 7, wherein the vibrator is composed of a piezoelectric single crystal, and the gyroscope comprises a driving electrode, for electrically exciting a vibration in the driving vibration mode, on the surface of each driving part and a detecting electrode, for detecting the vibration in the detection vibration mode, on the surface of each detecting part.

13. A vibratory gyroscope as claimed in claim 1, wherein the whole surface includes a second region where the stress induced in the vibrator due to the driving vibration mode is not higher than $\frac{1}{10}$ of a maximum value of the stress due to the driving vibration mode, with the damper provided on the second region.

14. A vibratory gyroscope as claimed in claim 1, wherein the polymer is an elastomer wherein a ratio of a maximum to a minimum of its dynamic viscoelasticity is not more than three times between −40° C. to +85° C.

15. A vibratory gyroscope for detecting a turning angular rate, the gyroscope comprising a piezoelectric vibrator comprising one or more driving parts for electrically exciting vibration in a driving vibration mode in the vibrator, one or more detecting parts, provided separately from the driving parts, for detecting Coriolis vibration in a detection vibration mode which occurs in the vibrator due to Coriolis force when the vibrator is turned, and a damper for reducing vibration sensitivity to external vibrations applied externally on the vibrator, the damper being made of a polymer and being provided on the detecting part, but not on the driving part.

16. A vibratory gyroscope as claimed in claim 15, wherein the damper is provided on only other regions in which each amplitude of vibration of each point is not less than 0.1 of the maximum amplitude of vibration in the vibrator in the driving vibration mode.

17. A vibratory gyroscope as claimed in claim 15, wherein the vibrator extends in a specified plane and the vibrator has a surface including a pair of main faces extending substantially in parallel with the specified plane and one or more side faces substantially perpendicular to the specified plane, with the damper provided on at least one face selected from the main faces and side faces.

18. A vibratory gyroscope as claimed in claim 17, wherein the damper covers a maximum curvature point on the main face of the detecting part, the point located on the center line of the main face where the curvature of the center line is maximum when the vibrator is deformed in the detection vibration mode.

19. A vibratory gyroscope as claimed in claim 17, wherein the damper covers a maximum stress point on the main face of the detecting part, the point located on the center line of the main face where the stress is maximum in the center line when the vibrator is deformed in the detection vibration mode.

20. A vibratory gyroscope as claimed in claim 17, wherein the vibrator is turned around a turning axis crossing through the specified plane, the vibrator comprises a plurality of vibration systems each extending in the specified plane, the vibration systems include a first vibration system, whose vibration comprises a radial vibration component vibrating in a diametrical direction with respect to the center of gravity in the specified plane, and a second vibration system, whose vibration comprises a circumferential vibration component vibrating circumferentially with respect to the center of gravity in the specified plane, one of the first vibration system and second vibration system comprises the driving part and the other comprises the detecting part.

21. A vibratory gyroscope as claimed in claim 17, wherein the detecting part has a surface including a region where stress induced in the vibrator due to the driving vibration mode is not higher than $\frac{1}{10}$ of a maximum value of the stress due to the driving vibration mode, with the damper provided on the region.

22. A vibratory gyroscope as claimed in claim 17, wherein the vibrator is composed of a piezoelectric single crystal, and the gyroscope comprises a driving electrode, for electrically exciting the vibration in the driving vibration mode, on the surface of each driving part and a detecting electrode, for detecting the vibration in the detection vibration mode, on the surface of each detecting part.

23. A vibratory gyroscope as claimed in claim 17, wherein the polymer is an elastomer wherein a ratio of a maximum to a minimum of its dynamic viscoelasticity is not more than three times between −40° C. to +85° C.

24. A vibratory gyroscope as claim 15, wherein the detecting part has a surface including a region where stress induced in the vibrator due to the driving vibration mode is not higher than $\frac{1}{10}$ of a maximum value of the stress due to the driving vibration mode, with the damper provided on the region.

25. A vibratory gyroscope as claimed in claim 15, wherein the vibrator is composed of a piezoelectric single crystal, and the gyroscope comprises a driving electrode, for electrically exciting the vibration in the driving vibration mode, on the surface of each driving part and a detecting electrode, for detecting the vibration in the detection vibration mode, on the surface of each detecting part.

26. A vibratory gyroscope as claimed in claim 25, wherein the detecting part comprises its root, the detecting electrode comprises one edge portion near the root and the damper covers at least the edge portion.

27. A vibratory gyroscope as claimed in claim 15, wherein the polymer is an elastomer wherein a ratio of a maximum to a minimum of its dynamic viscoelasticity is not more than three times between −40° C. to +85° C.

* * * * *